(12) United States Patent
Guzik et al.

(10) Patent No.: US 11,696,247 B2
(45) Date of Patent: Jul. 4, 2023

(54) CLOCK SYNCHRONIZATION AND DATA REDUNDANCY FOR A MESH NETWORK OF USER DEVICES

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 64 days.

(21) Appl. No.: 17/354,835

(22) Filed: Jun. 22, 2021

(65) Prior Publication Data

US 2022/0408391 A1    Dec. 22, 2022

(51) Int. Cl.
  *H04W 56/00* (2009.01)
  *H04W 84/18* (2009.01)
  (Continued)

(52) U.S. Cl.
  CPC .......... *H04W 56/0055* (2013.01); *G06F 1/04* (2013.01); *G06F 1/163* (2013.01); *H04W 56/0035* (2013.01); *H04W 84/18* (2013.01)

(58) Field of Classification Search
  CPC . H04W 56/001; H04W 56/0035; G06F 3/165; H04N 5/2257; H04N 7/185;
  (Continued)

(56) References Cited

U.S. PATENT DOCUMENTS

| | | | | |
|---|---|---|---|---|
| 5,991,844 A | * | 11/1999 | Khosrowpour | G06F 13/405 713/400 |
| 7,409,557 B2 | * | 8/2008 | Teppler | H04L 9/3297 713/178 |

(Continued)

OTHER PUBLICATIONS

Cloud Connected Guns for Cops that can Recognize Shots & Alert Backup in Realtime, Linus Tech Tips, Messageboard User Tech_Dreamer, Oct. 24, 2014. URL: https://linustechtips.com/topic/238322-cloud-connected-guns-for-cops-that-can-recognize-shots-alert-backup-in-realtime/.

(Continued)

*Primary Examiner* — Jung Liu
(74) *Attorney, Agent, or Firm* — Han Santos, PLLC

(57) ABSTRACT

A hub may receive event data captured by a body-worn device and store the event data in a memory of the hub. The event data is then backed up from the hub to a memory of an additional hub communicatively connected to the hub. A copy of event data for a predetermined period of time as included in the event data is then transferred from the memory of the hub to a data store of a network operations center (NOC). In response to the transfer being complete, the hub may delete the event data for the predetermined period of time, send a first command to the additional hub directing the additional hub to delete a backup of the event data for the predetermined period of time, or send a second command to the body-worn device directing the body-worn device to delete the event data for the predetermined period of time.

20 Claims, 9 Drawing Sheets

(51) Int. Cl.
*G06F 1/16* (2006.01)
*G06F 1/04* (2006.01)

(58) Field of Classification Search
CPC .... H04N 5/2253; H04N 5/23203; H04N 7/14; H04N 21/4223; H04N 5/23206; H04N 5/91; H04N 5/23238; G10L 25/51; B60L 53/66; B64C 39/024; G08B 13/1966
See application file for complete search history.

(56) References Cited

U.S. PATENT DOCUMENTS

| | | | | |
|---|---|---|---|---|
| 7,969,963 | B2* | 6/2011 | Duan | G01S 13/765 |
| | | | | 342/458 |
| 8,719,452 | B1* | 5/2014 | Ding | H04N 21/4344 |
| | | | | 709/248 |
| 9,124,258 | B2* | 9/2015 | Pechaud | H03K 5/19 |
| 9,395,432 | B2* | 7/2016 | Boyd | H04W 24/08 |
| 9,810,766 | B2* | 11/2017 | Boyd | H04W 24/08 |
| 9,829,343 | B2* | 11/2017 | Sobotka | G01R 31/42 |
| 10,370,102 | B2* | 8/2019 | Boykin | H04N 5/23206 |
| 10,403,124 | B1* | 9/2019 | Schuler | F41C 33/029 |
| 10,673,883 | B2* | 6/2020 | Wetterwald | H04L 43/0852 |
| 11,442,173 | B2* | 9/2022 | Kim | G01S 19/39 |
| 11,457,172 | B2* | 9/2022 | Takahashi | H04N 5/77 |
| 2004/0167990 | A1* | 8/2004 | Peer | H04L 69/28 |
| | | | | 709/248 |
| 2006/0056560 | A1* | 3/2006 | Aweya | H04J 3/0664 |
| | | | | 375/356 |
| 2006/0056563 | A1* | 3/2006 | Aweya | H03L 7/093 |
| | | | | 713/400 |
| 2010/0172339 | A1* | 7/2010 | Duan | G01S 13/765 |
| | | | | 370/350 |
| 2013/0076398 | A1* | 3/2013 | Pechaud | H03K 5/26 |
| | | | | 327/31 |
| 2013/0138991 | A1* | 5/2013 | Reinke | G06F 1/12 |
| | | | | 713/400 |
| 2018/0050800 | A1* | 2/2018 | Boykin | G10L 25/51 |
| 2019/0268526 | A1* | 8/2019 | Sosnovsky | G06F 3/165 |
| 2021/0132177 | A1* | 5/2021 | Srinivas | H04L 5/143 |
| 2022/0110504 | A1* | 4/2022 | Inglis | A61B 1/267 |
| 2022/0295437 | A1* | 9/2022 | Maluf | H04W 56/001 |
| 2022/0318095 | A1* | 10/2022 | Gautam | G06F 16/128 |

OTHER PUBLICATIONS

Miners, Zach. Startup arms cops with Internet-connected 'smart' guns, PC World, Oct. 27, 2014. URL: https://www.pcworld.com/article/2839581/startup-arms-cops-with-internetconnected-smart-guns.html.
Szondy, David. Wireless Yardarm Sensor monitors firearm use in real time, New Atlas, Oct. 27, 2014. URL: https://newatlas.com/yardarm-sensor-firearms/34409/.
Yardarm. Mar. 2021. URL: http://www.yardarmtech.com.

* cited by examiner

CLOCK SYNCHRONIZATION AND DATA REDUNDANCY FOR A MESH NETWORK OF USER DEVICES

BACKGROUND

Law enforcement officers generally carry multiple body-worn electronic devices as they perform their law enforcement functions. For example, law enforcement agencies are increasingly mandating that their police officers carry and use portable recording devices to record their interactions with the public. The recordings may serve to protect the public from improper policing, as well as protect law enforcement officers from false allegations of police misconduct. Other examples of electronic devices that are carried by a law enforcement officer may include a radio, a smartphone, a biometric monitor, a non-lethal electronic shock weapon, and electronic add-on sensors for the officer's primary weapon, i.e., a gun. The add-on sensors may include a sensor that detects the unholster of an officer's gun from its holster or a sensor that detects the firing of the officer's gun. While these electronic devices are designed to aid the officer in performing his or her duties in protecting and serving the public, they are often configured to work independently of one another.

SUMMARY

Described herein are techniques for forming a mesh network of user devices, including body-worn hubs and associated body-worn devices, and to synchronize the collection of event data and provide data redundancy for the collection of event data. The body-worn devices may include a body camera, a radio, a smartphone, a biometric monitor, a non-lethal electronic shock weapon, electronic add-on sensors for the officer's primary weapon, and/or so forth. The body-worn hub may include a built-in battery, power distribution components, data processing components, short-range wireless communication components, long-range wireless communication components, physical interface components, and/or so forth. In some instances, the body-worn hub may be a standalone device that is worn on the body of the law enforcement officer. In other instances, the body-worn hub may be integrated into another garment or another piece of equipment already worn by the law enforcement officer, such as a ballistic vest, a body camera, etc. Each set of components may include hardware components, software components, or a combination of software and hardware components. The short-range wireless communication components may enable the body-worn hub to exchange communications with the various body-worn devices via short-range wireless communication, such as Bluetooth, ultra-wide band (UWB), or Wi-Fi, as well as exchange communications with a remote hub, such as a hub in a law enforcement vehicle of the officer or a hub associated with another law enforcement officer. The long-range wireless communication components may enable the body-worn hub to exchange communications with a computing device at a network operations center (NOC) via long-range wireless communication, such as cellular or satellite communication.

In some instances, a body-worn device in a mesh network may be configured to synchronize its internal clock with an internal clock of a hub in the mesh network. For example, the hub may be a body-worn hub or a vehicle hub. Such clock synchronization may take place when the body-worn device initially connects to the body-worn hub via a communication connection or reconnects to the body-worn hub via a communication connection. The clock synchronization may also take place when the hub determines via its internal clock that a predetermined period of time has passed or when the hub receives event data of an event from the body-worn device. Any time discrepancy between the internal clocks may be recorded by the hub in a clock discrepancy log for the body-worn device. Accordingly, such clock synchronization may help to ensure that the date and time associated with the occurrence of an event, as captured by the body-worn device, are accurate. For example, in some instances, the clock discrepancy log may be used to extrapolate when an event actually occurred. The accuracy of the date and time information associated with the occurrences of multiple events may be important for determining or reconstructing an order in which the multiple events occurred for evidentiary purposes in a law enforcement setting. In other instances, a body-worn device in a mesh network may coordinate the backup of event data captured by a body-worn device with various hubs in the mesh network, such as a body-worn hub and/or a vehicle hub. These body-worn devices and hubs may be used by multiple law enforcement officers.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
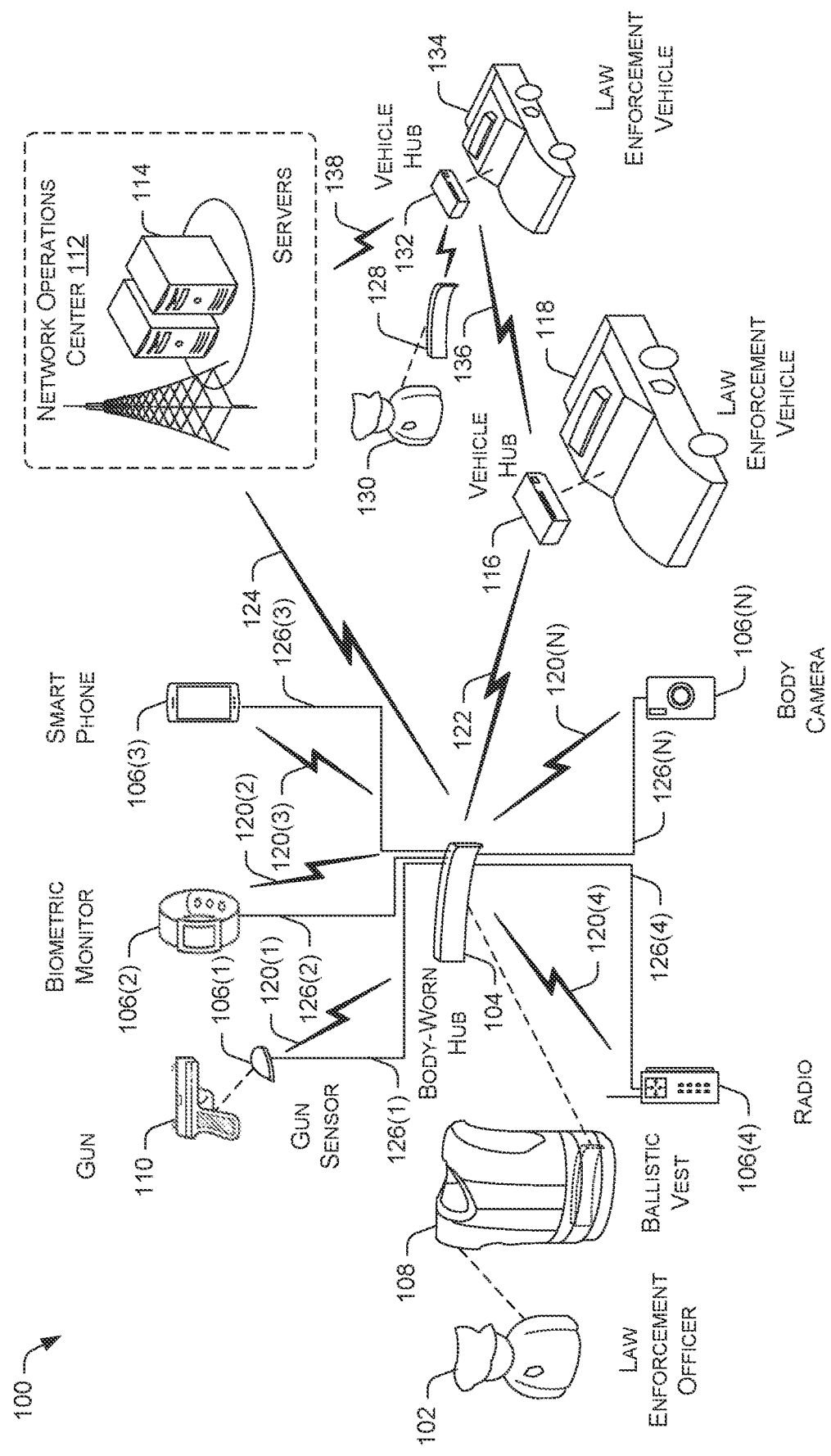
FIG. 1 illustrates an example environment for implementing clock synchronization and data redundancy in a mesh network of user devices.

Described herein are techniques for forming a mesh network of user devices, including body-worn hubs and associated body-worn devices, to synchronize the collection of event data and provide data redundancy for the collection of event data. The body-worn devices may include a body camera, a radio, a smartphone, a biometric monitor, a non-lethal electronic shock weapon, electronic add-on sensors for the officer's primary weapon, and/or so forth. The body-worn hub may include a built-in battery, power distribution components, data processing components, short-range wireless communication components, long-range wireless communication components, physical interface components, and/or so forth. In some instances, the body-worn hub may be a standalone device that is worn on the body of the law enforcement officer. In other instances, the body-worn hub may be integrated into another garment or another piece of equipment already worn by the law enforcement officer, such as a ballistic vest, a body camera, etc. Each set of components may include hardware components, software components, or a combination of software and hardware components. The short-range wireless communication components may enable the body-worn hub to exchange communications with the various body-worn devices via short-range wireless communication, such as Bluetooth, ultra-wide band (UWB), or Wi-Fi, as well as exchange communications with a remote hub, such as a hub in a law enforcement vehicle of the officer or a hub associated with another law enforcement officer. The long-range wireless communication components may enable the body-worn hub to exchange communications with a computing device at a network operations center (NOC) via long-range wireless communication, such as cellular or satellite communication.

In some instances, a body-worn device in a mesh network may be configured to synchronize its internal clock with an internal clock of a hub in the mesh network. For example, the hub may be a body-worn hub or a vehicle hub. Such clock synchronization may take place when the body-worn device initially connects to the hub via a communication connection or reconnects to the hub via a communication connection. The clock synchronization may also take place when the body-worn hub determines via its internal clock that a predetermined period of time has passed or when the hub receives event data of an event from the body-worn device. Any time discrepancy between the internal clocks may be recorded by the hub in a clock discrepancy log for the body-worn device. Accordingly, such clock synchronization may help to ensure that the data and time associated with the occurrence of an event, as captured by the body-worn device, are accurate. For example, in some instances, the clock discrepancy log may be used to extrapolate when an event actually occurred. The accuracy of the data and time information associated with the occurrences of multiple events may be important for determining or reconstructing an order in which the multiple events occurred for evidentiary purposes in a law enforcement setting.

In other instances, a body-worn device in a mesh network may coordinate the storage of event data captured by a body-worn device with various hubs in the mesh network. In some embodiments, the body-worn device may store event data that is captured by the body-worn device in a memory of the body-worn device, as well as transfer a copy of the event data to a hub that is connected to the body-worn device. For example, the hub may be a body-worn hub or a vehicle hub. In some instances, the hub may further transfer the copy of the event data to a data store of a NOC. Subsequently, the body-worn device may be configured to delete the event data for a predetermined period of time from its memory when the body-worn device receives a command to delete such event data from the hub. Likewise, the body-worn device may be configured to delete a predetermined amount of oldest event data from the memory of the body-worn device when an amount of available storage space in the memory of the body-worn device drops below a predetermined amount threshold.

In additional embodiments, the body-worn hub may receive event data captured by a body-worn device and backup the event data in a memory of the body-worn hub. A copy of the event data is then transferred by the body-worn hub to a memory of an additional hub that is communicatively connected to the body-worn hub. Subsequently, the body-worn hub may transfer a copy of the event data for a predetermined period of time from the memory of the body-worn hub to a data store of the NOC. Following the transfer, the body-worn hub may receive a confirmation from a server of the NOC indicating that the transfer is complete. In response, the body-worn hub may delete the event data for the predetermined period of time from the memory of the body-worn hub. The body-worn hub may further send a first command to the additional hub directing the additional hub to delete a backup of the event data for the predetermined period of time from the memory of the additional hub, as well as send a second command to the body-worn device directing the body-worn device to delete the event data for the predetermined period of time from the memory of the body-worn device.

In other embodiments, a vehicle hub may receive event data captured by a body-worn device and store the event data in a memory of the vehicle hub. The event data is then backed up from the body-worn hub to a memory of an additional hub that is communicatively connected to the vehicle hub. For example, the additional hub may be an additional vehicle hub or a body-worn hub that is communicatively connected to the vehicle hub. The vehicle hub may transfer a copy of the event data for a predetermined period of time from the memory of the vehicle hub to a data store of the NOC. Following the transfer, the vehicle hub may receive a confirmation from a server of the NOC indicating that the transfer is complete. In response, the vehicle hub may delete the event data for the predetermined period of time from the memory of the vehicle hub. The vehicle hub may further send a first command to the additional hub directing the vehicle hub to delete a backup of the event data for the predetermined period of time from the memory of the additional hub, as well as send a second command to the body-worn device directing the body-worn device to delete the event data for the predetermined period of time from the memory of the body-worn device.

In further embodiments, a first hub assigned to the first person may receive event data captured by a body-worn device and store the event data in a memory of the first hub. The event data is then backed up from the first hub of the first person to a memory of a second hub assigned to the second person that is communicatively connected to the first hub. Subsequently, the first hub may transfer a copy of the event data for a predetermined period of time from the memory of the first hub to a data store of the NOC. Following the transfer, the first hub may receive a confirmation from a server of the NOC indicating that the transfer is complete. In response, the first hub may delete the event data for the predetermined period of time from the memory of the first hub. The first hub may further send a first command to the second hub directing the second hub to delete a backup of the event data for the predetermined period of time from the memory of the second hub, as well as send a second command to the body-worn device directing the body-worn device to delete the event data for the predetermined period of time from the memory of the body-worn device.

The use of a mesh network to provide body-worn devices and various hubs with data redundancy may ensure that event data captured by the body-worn devices are backed up or stored in a manner the reduces or eliminates inadvertent data loss due to malfunction or destruction of the body-worn devices or hubs. Thus, such event data may be preserved for evidentiary use in legal settings. Example implementations are provided below with reference to FIGS. 1-9.

Example Environment

FIG. 1 illustrates an example environment 100 for implementing clock synchronization and data redundancy in a mesh network of body-worn hubs. The environment 100 may include a law enforcement officer 102 that is equipped with a body-worn hub 104 and multiple body-worn devices 106(1)-106(N). In some embodiments, the body-worn hub 104 may be a standalone device that is worn by the law enforcement officer 102. In other embodiments, the body-worn hub 104 may be integrated into a garment or a piece of equipment that is worn by the law enforcement officer 102. For example, the body-worn hub 104 may be integrated into a ballistic vest 108 that is worn by the law enforcement officer 102. The body-worn device 106(1)-106(N) may include various devices that are carried by the law enforcement officer 102. For example, the body-worn device 106(1) may be a gun sensor that is attached to a gun 110 or a holster for the gun 110, such that the gun sensor may detect whether the gun 110 is holstered unholstered, cocked, decocked, fired, misfired, dropped, and/or so forth. The body-worn device 106(2) may be a biometric monitor (e.g., a smartwatch) that monitors the vital signs of the law enforcement officer 102, such as body temperature, blood pressure, heart rate, etc. The body-worn device 106(3) may be a smartphone that is carried by the law enforcement officer 102. The body-worn device 106(4) may be a radio that the law enforcement officer 102 uses to communicate with a network operations center (NOC) 112. The NOC 112 may include servers 114 that implement a computer-assisted dispatch platform, a data processing platform, and a data file storage platform. For example, the NOC 112 may be a part of a police station or an emergency assistance dispatch center. The servers 114 may be physical servers located at the NOC 112 or virtual servers that are implemented in a cloud. The body-worn device 106(N) may be a body camera that is capable of capturing audiovisual recording, e.g., video, of scenes and events encountered by the law enforcement officer 102.

Each of the body-worn devices 106(1)-106(N) may have short-range wireless communication capabilities, such as Bluetooth, UWB, Wi-Fi, etc., and/or long-range wireless communication capabilities, such as cellular, satellite, etc. The cellular and satellite communication capabilities may be provided by respective cellular or satellite service providers. In some instances, a body-worn device may be capable of using the short-range wireless communication capabilities to communicate with another body-worn device or a hub, such as the body-worn hub 104. In other instances, a body-worn device may be capable of using the long-range wireless communication capabilities to communicate with the hub or the servers 114 of the NOC 112. Additionally, each of the body-worn devices 106(1)-106(N) may be equipped with an electrically conductive coupling port that enables the device to send power to and receive power from another device, as well as exchange communication with another device. For example, the electrically conductive coupling port may be a mating receptacle that is configured to accept a mating plug of an electrically conductive wired connector, in which the wired connector includes a set of one or more electrically conductive wires or cables sufficient to complete an electrical circuit between two devices. However, in other implementations, the mating receptacle and plug may be substituted with other detachable connection mechanisms, such as a magnetic electrical connection mechanism. In some embodiments, the body-worn device may use the electrically conductive coupling port to send and receive communication that is encoded using digital and/or analog signals.

The body-worn hub 104 may have similar short-range and long-range wireless communication capabilities. In some instances, the body-worn hub 104 may be capable of using the short-range wireless communication capabilities to communicate with another body-worn device or a remote hub, such as the vehicle hub 116 in the law enforcement vehicle 118. For instance, the body-worn hub 104 may establish short-range wireless communication links 120(1)-120(N) with the body-worn devices 106(1)-106(N), respectively. In this way, the body-worn hub 104 and the body-worn devices 106(1)-106(N) may form a wireless mesh network of user devices. The body-worn devices 106(1)-106(N) and the body-worn hub 104 may use the short-range wireless communications links 120(1)-120(N) to exchange communication. For example, the body-worn devices 106(1)-106(N) may use the short-range wireless communications links 120(1)-120(N) to send event data of events detected or recorded by the sensors of the body-worn devices 106(1)-106(N) to the body-worn hub 104. Conversely, the body-worn hub 104 may use the short-range wireless communications links 120(1)-120(N) to send commands to the body-worn devices 106(1)-106(N) that trigger one or more of the body-worn devices 106(1)-106(N) to perform one or more actions in response to events that are detected.

As examples, the events that are detected or recorded by the sensors may include the gun sensor 106(1) detecting that a gun 110 of the law enforcement officer 102 is unholstered or holstered, an accelerometer in the smartphone 106(3) detecting that the officer is running, walking, or remaining still for a predetermined period of time, the biometric monitor 106(2) detecting that the heart rate of law enforcement officer 102 exceeding or falling below a predetermined rate threshold, an impact sensor in the ballistic vest 108 detecting an impact, and/or so forth. Thus, the events that are detected may include discrete events, such as a gun being unholstered or holstered, or a series of continuous events, such as a series of heart rate readings or body temperature readings. Further, the event notification for an event may include one or more predetermined encoded values that correspond to the occurrence of the event. The event notification for an event may also be accompanied by sensor data that are captured by a sensor of a body-worn device for the event. For example, the sensor data may include audio data, video data, multimedia data, and/or so forth.

In another instance, the body-worn hub 104 may establish a short-range wireless communication link 122 with the vehicle hub 116, so that communications may be exchanged between the body-worn hub 104 and the vehicle hub 116. For example, the body-worn hub 104 may use the short-range wireless communication link 122 to send event data of events detected or recorded by the sensors of the body-worn devices 106(1)-106(N) to the vehicle hub 116, such as for data processing and/or backup purposes. Conversely, the vehicle hub 116 may use the short-range wireless communication link 122 to send commands to the body-worn hub 104. The commands may trigger one or more of the body-worn devices 106(1)-106(N) that are connected to the body-worn hub 104 to perform one or more actions in response to events that are detected. In other instances, the body-worn hub 104 may be capable of using the long-range wireless communication capabilities to communicate with a remote hub, such as the vehicle hub 116, or the servers 114 of the NOC 112. For instance, the body-worn hub 104 may establish a long-range wireless communication link 124 with the servers 114 of the NOC 112. In such an instance, the long-range wireless communication link 124 may be used by the body-worn hub 104 to send event data of events detected or recorded by the sensors of the body-worn devices 106(1)-106(N) to the servers 114 of the NOC 112. Conversely, the servers 114 may use the long-range wireless communication link 124 to send commands to the body-worn hub 104. The commands may trigger one or more of the body-worn devices 106(1)-106(N) that are connected to the body-worn hub 104 to perform one or more actions in response to events that are detected.

Additionally, the body-worn hub 104 may be equipped with a set of electrically conductive coupling ports that are similar to those featured on the body-worn devices 106(1)-106(N), in which a coupling port is a receptacle that may accept the mating plug of an electrically conductive wired connector that connects the body-worn hub to a body-worn device. However, in other implementations, the set of mating receptacles and plugs may be substituted with other detachable connection mechanisms, such as a magnetic connection mechanism. In this way, the body-worn hub 104 may send power to and receive power from the body-worn devices 106(1)-106(N), as well as exchange communication with the body-worn devices 106(1)-106(N) via wired connections. For example, the body-worn hub 104 may be connected to the body-worn devices 106(1)-106(N) via respective electrically conductive wired connectors 126(1)-126(N). In other words, the electrically conductive wired connectors 126(1)-126(N) may enable the body-worn hub 104 and the body-worn devices 106(1)-106(N) to form a wired mesh network.

In further embodiments, the body-worn hub 104 may be configured such that the hub will automatically stop using wireless communication with a body-worn device and default to using wired communication when an electrically conductive wired connection is made between the body-worn hub and the body-worn device. The wired communication may enable at least the same data to be exchanged between the body-worn hub 104 and the body-worn device as the wireless communication. For example, when a wired communication link is established between the body-worn hub 104 and the gun sensor 106(1) via the wired connector 126(1), the body-worn hub 104 may automatically terminate an existing wireless communication link 120(1) between the body-worn hub 104 and the gun sensor 106(1). However, when the electrically conductive wired connection between the body-worn hub and the body-worn device is disconnected, the body-worn hub 104 may automatically switch to using wireless communication with the body-worn device. For example, when the wired communication link between the body-worn hub 104 and the gun sensor 106(1) is terminated due to the disconnection of the wired connector 126(1), the body-worn hub 104 may reestablish the wireless communication link 120(1) with the gun sensor 106(1).

The body-worn hub 104 may process the event data that the hub receives from one or more body-worn devices, such as one or more of the body-worn devices 106(1)-106(N), to determine whether to trigger the performance of actions by at least one body-worn device of the 106(1)-106(N). In some embodiments, the body-worn hub 104 may include a software event handler that processes event data and generate commands for the connected body-worn devices. For example, the body-worn hub 104 may trigger the body camera 106(N) of a law enforcement officer 102 to start a video recording when the body-worn hub 104 is notified by the gun sensor 106(1) that the officer's gun is unholstered.

In some embodiments, a body-worn device in a mesh network may be configured to synchronize its internal clock with an internal clock of a hub in the mesh network. For example, the hub may be a body-worn hub or a vehicle hub. Such clock synchronization may take place when the body-worn device initially connects to the body-worn hub via a communication connection or reconnects to the body-worn hub via a communication connection. The clock synchronization may also take place when the body-worn hub determines via its internal clock that a predetermined period of time has passed or when the body-worn hub receives event data of events from the body-worn device. Any time discrepancy between the internal clocks may be recorded by the body-worn hub in a clock discrepancy log for the body-worn device. For example, the body-worn hub 104 may detect that the body camera 106(N) is communicatively connected to the body-worn hub 104. Accordingly, the body-worn hub 104 may record any time discrepancy between its own internal clock and an internal clock of the body camera 106(N) in a clock discrepancy log for the body camera 106(N). Subsequently, the body-worn hub 104 may send a synchronization command that synchronizes the internal clock of the body camera 106(N) to the internal clock of the body-worn hub 104.

The body-worn hub 104 may also send such a synchronization command to the body camera 106(N) when the body camera 106(N) disconnects and reconnects to the body-worn hub 104, or when the body-worn hub 104 determines that a predetermined amount of time has passed. In other instances, the body-worn hub 104 may send such a synchronization command to the body camera 106(N) when the body camera 106(N) sends event data to the body-worn hub 104.

In other embodiments, the body-worn devices and the body-worn hubs may form various additional ad hoc wireless mesh networks. For example, one or more of the body-worn devices 106(1)-106(N) may form wireless communication connections with a body-worn hub 128 of the law enforcement officer 130, instead of with the body-worn hub 104 of the law enforcement officer 102. This may be due to the body-worn hub 104 suffering a malfunction or a body-worn device being out of the short-range wireless communication range of the body-worn hub 104 and within the short-range wireless communication range of the body-worn hub 128, such as when the body-worn device is dropped by the law enforcement officer 102. In an additional example, the body-worn hub 104 may form a wireless communication connection with the vehicle hub 132 in a vehicle 134 of the law enforcement officer 130, instead of the vehicle hub 116 in a vehicle of the law enforcement officer 102. This may be due to the body-worn hub 104 being out of the short-range wireless communication range of the vehicle hub 116 and within the short-range wireless communication range of the vehicle hub 132. In another example, the vehicle hub 116 may form a wireless communication connection 136 with the vehicle hub 132 when the vehicle hub 116 is unable to directly reach the servers 114 of the NOC 112 via a long-range wireless communication connection. The wireless communication connection between the vehicle hubs may be a short-range wireless communication connection or a long-range wireless communication. Since the vehicle hub 132 has an active wireless communication connection 138 with the servers 114 of the NOC 112, the vehicle hub 116 may use the vehicle hub 132 as a relay to exchange communication with the servers 114 of the NOC 112. Similarly, a first body-worn hub, such as the body-worn hub 104, may also form a communication connection with a second body-worn hub, such as the body-worn hub 128 via short-range or long-range wireless communication. For example, the first body-worn hub as assigned a first law enforcement officer may use the second body-worn hub as assigned to a second law enforcement officer as a bridging hub to communicate with a vehicle hub that is assigned to the first law enforcement officer.

In additional embodiments, a body-worn device in a mesh network may coordinate the storage of event data captured by a body-worn device with various hubs in the mesh network, such as a body-worn hub and/or a vehicle hub. In some instances, the body-worn device (e.g., body-worn device 106(N)) may store event data that originates from the body-worn device in a memory of the body-worn device, as well as transfer a copy of the event data to a hub that is connected to the body-worn device. For example, the hub may be a body-worn hub (e.g., the body-worn hub 104) or a vehicle hub (e.g., the vehicle hub 116). In some instances, the hub may further transfer the copy of the event data to a data store of the NOC 112. Subsequently, the body-worn device may be configured to delete the event data for a predetermined period of time from its memory when the body-worn device receives a command to delete such event data from the hub. Likewise, the body-worn device may be configured to delete a predetermined amount of oldest event data from the memory of the body-worn device when an amount of available storage space in the memory of the body-worn device drops below a predetermined amount threshold.

In additional embodiments, the body-worn hub (e.g., the body-worn hub 104) may receive event data captured by a body-worn device (e.g., the body-worn device 106(N)) and backup the event data in a memory of the body-worn hub. A copy of the event data is then transferred by the body-worn hub to a memory of a vehicle hub (e.g., the vehicle hub 116 or the law enforcement vehicle 118) that is communicatively connected to the body-worn hub. Subsequently, the body-worn hub may transfer a copy of the event data for a predetermined period of time from the memory of the body-worn hub to a data store of the NOC 112. Following the transfer, the body-worn hub may receive a confirmation from a server 114 of the NOC 112 indicating that the transfer is complete. In response, the body-worn hub may delete the event data for the predetermined period of time from the memory of the body-worn hub. The body-worn hub may further send a first command to the vehicle hub directing the vehicle hub to delete a backup of the event data for the predetermined period of time from the memory of the vehicle hub, as well as send a second command to the body-worn device directing the body-worn device to delete the event data for the predetermined period of time from the memory of the body-worn device.

In other embodiments, a vehicle hub (e.g., the vehicle hub 116) may receive event data captured by a body-worn device (e.g., the body camera 106(N)) and store the event data in a memory of the vehicle hub. The event data is then backed up from the body-worn hub to a memory of an additional hub that is communicatively connected to the vehicle hub. For example, the additional hub may be an additional vehicle hub (e.g., the vehicle hub 132) or a body-worn hub (e.g., body-worn hub 128) that is communicatively connected to the vehicle hub. The vehicle hub may transfer a copy of the event data for a predetermined period of time from the memory of the vehicle hub to a data store of the NOC. Following the transfer, the vehicle hub may receive a confirmation from a server 114 of the NOC 112 indicating that the transfer is complete. In response, the vehicle hub may delete the event data for the predetermined period of time from the memory of the vehicle hub. The vehicle hub may further send a first command to the additional hub directing the vehicle hub to delete a backup of the event data for the predetermined period of time from the memory of the additional hub, as well as send a second command to the body-worn device directing the body-worn device to delete the event data for the predetermined period of time from the memory of the body-worn device.

In further embodiments, a first body-worn hub (e.g., the body-worn hub 104) assigned to the first person (e.g., the law enforcement officer 102) may receive event data captured by a body-worn device (e.g., the body camera 106(N)) and store the event data in a memory of the first body-worn hub. The event data is then backed up from the first body-worn hub of the first person to a memory of a second body-worn hub (e.g., the body-worn hub 128) assigned to the second person (e.g., the law enforcement officer 130) that is communicatively connected to the first body-worn hub. Subsequently, the first body-worn hub may transfer a copy of the event data for a predetermined period of time from the memory of the first body-worn hub to a data store of the NOC 112. Following the transfer, the first body-worn hub may receive a confirmation from a server 114 of the NOC 112 indicating that the transfer is complete. In response, the first body-worn hub may delete the event data for the predetermined period of time from the memory of the first body-worn hub. The first body-worn hub may further send a first command to the second body-worn hub directing the second body-worn hub to delete a backup of the event data for the predetermined period of time from the memory of the second body-worn hub, as well as send a second command to the body-worn device directing the body-worn device to delete the event data for the predetermined period of time from the memory of the body-worn device.

Example Body-Worn Device Components

Figure 2:
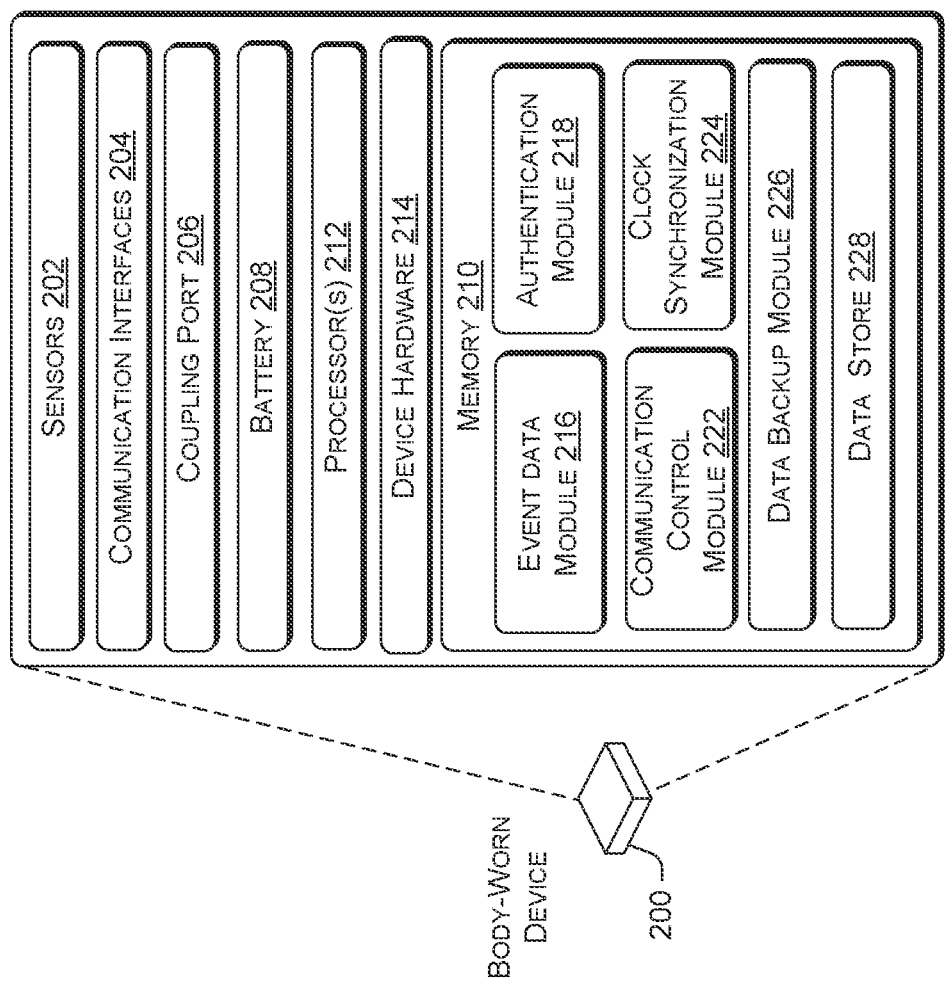
FIG. 2 is a block diagram showing various components of a body-worn device that participates in clock synchronization and data redundancy when integrated into a mesh network of user devices.

FIG. 2 is a block diagram showing various components of a body-worn device that participates in clock synchronization and data redundancy when integrated into a mesh network of user devices. The body-worn device 200 may be equipped with one or more sensors 202, communication interfaces 204, an electrically conductive coupling port 206, a battery 208, memory 210, one or more processors 212, and device hardware 214. The sensors 202 may include a compass, an accelerometer, one or more pressure sensors, a global positioning system (GPS) sensor, an audio sensor, a video sensor, and/or so forth. The communication interfaces 204 may include short-range wireless transceivers (e.g., Bluetooth, UWB, Wi-Fi, and/or so forth) and long-range wireless transceivers (e.g., cellular, satellite, and/or so forth) that enable the body-worn device 200 to wirelessly communicate with other devices. The electrically conductive coupling port 206 may be configured to accept an electrically conductive wired connector. The wired connector may be used by the body-worn device 200 to receive power input to the body-worn device 200 from an external source, output power from the body-worn device 200 to an external load, as well as perform wired communication.

The memory 210 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 214 may include user interface hardware, such as physical buttons, a gesture recognition mechanism, or a voice activation mechanism. The device hardware 214 may further include signal converters, antennas, modems, hardware decoders and encoders, graphic processors, digital signal processors, microprocessors, power routing circuitry, a real-time clock (RTC) circuit, and/or so forth. The device hardware 214 may enable the body-worn device 200 to exchange wired or wireless communication with other devices via the communication interfaces 204, as well as receive power or output power via the electrically conductive coupling port 206 based on software instructions.

The processors 212 and the memory 210 of the body-worn device 200 may implement an event data module 216, an authentication module 218, a communication control module 222, a clock synchronization module 224, and a data backup module 226. These modules may include routines, program instructions, objects, and/or data structures that perform particular tasks or implement particular abstract data types. The memory 210 may further store software (e.g., drivers, applications, firmware, etc.) that support various functionalities of the body-worn device 200, such as software that are executed by the processors 212 to support the establishment of wired and wireless communication links. The memory 210 may also provide a data store 228 that is capable of storing event data. The event data may include sensor data captured by the sensors 202, associated metadata for the sensor data, and/or so forth. In some embodiments, an operating system may also be implemented via the one or more processors 212 and the memory 210 to perform various functions, as well as provide an execution environment that supports the executions of applications and modules.

The event data module 216 may send event data that includes event notifications of detected events and/or sensor data associated with the events to the body-worn hub 104, the vehicle hub 116, or the servers 114 of the NOC 112. The vehicle hub 116 may relay communications from other devices and hubs to the server 114, and vice versa. The event data module 216 may send the event data to the body-worn hub 104 via available wired communication or alternatively via short-range wireless communication. However, event data that are destined for the vehicle hub 116 or the servers 114 are sent via short-range or long-range wireless communication. In turn, the event data module 216 may receive commands for the body-worn device 200 to perform specific actions. For example, such actions may include activating or deactivating one or more specific sensors, built-in functions, software applications, hardware components, and/or so forth of the body-worn device 200.

The authentication module 218 may handle the authentication of the body-worn device 200 to various hubs and the server 114 of the NOC 112 so that the body-worn device 200 may exchange wireless communication with the various hubs and the server 114. In order to establish a wireless communication link with a hub, the authentication module 218 may use a device authentication credential (e.g., a device identifier, a secret code, a key, a digital certificate, and/or so forth) to authenticate the body-worn device 200 to the hub. Alternatively, or concurrently, the hub may provide a hub authentication credential to the authentication module 218 so that the module may authenticate the body-worn hub. Accordingly, the authentication module 218 may determine that the hub authentication credential of the hub is valid when the hub authentication credential matches an authorized hub authentication credential stored in the data store 228. The data store 228 may contain a list of hub authentication credentials that may be updated or modified by the server 114 of the NOC 112. In some embodiments, the authentication module 218 may also be configured to perform a secret key exchange with a hub or a server so that a corresponding secret key can be used to encrypt and decrypt the secured communication exchanged.

The communication control module 222 may switch the body-worn device 200 between using the short-range wireless transceiver and the electrically conductive coupling port 206 to exchange communications with the body-worn hub 104. The communication control module 222 may use the authentication module 218 to perform authentication in order to establish a short-range wireless communication link with the body-worn hub 104. In some embodiments, the communication control module 222 may automatically terminate a short-range wireless communication link that is established with the body-worn hub 104 when a wired connection is established with the body-worn hub 104 via the electrically conductive coupling port 206. For example, the communication control module 222 may detect that the body-worn device 200 is connected to another device via a wired connector by a detected change in one or more electrical properties (e.g., voltage, resistance, and/or current) at the electrically conductive coupling port 206. As a result, the communication control module 222 may terminate the short-range wireless communication link by powering off the short-range wireless transceiver.

In other embodiments, the communication control module 222 may further use a wired communication protocol (e.g., Universal Serial Bus (USB) protocol, TCP/IP, or some other wired communication protocol) to establish a wired communication link with the body-worn hub 104 over the wired connection. In some instances, the communication control module 222 may wait for the body-worn hub 104 to initiate the establishment of the wired communication link using the wired communication protocol. However, in other instances, the communication control module 222 may initiate the establishment of the wired communication link with the body-worn hub 104 using the wired communication protocol. Once the wired communication link is established, the communication control module 222 may terminate the short-range wireless communication link by powering off the short-range wireless transceiver.

In still other embodiments, the communication control module 222 may terminate the short-range wireless communication link when a short-range wireless communication termination command is received from the body-worn hub 104. The communication control module 222 may receive the termination command when a wired connection is established between the body-worn device 200 and the body-worn hub 104 via the electrically conductive coupling port 206. The termination command may be received via the wired connection between the body-worn device 200 and the body-worn hub 104. Accordingly, the communication control module 222 may terminate the short-range wireless communication by powering off the short-range wireless transceiver. However, in other instances, the body-worn hub 104 may simply terminate the short-range wireless communication link between the body-worn device 200 and the body-worn hub 104 at its end once the wired connection is established between the body-worn device 200 and the body-worn hub 104. In some instances, following the power off of the short-range wireless transceiver, the communication control module 222 may send a short-range wireless transceiver termination confirmation to the body-worn hub 104 via the electrically conductive coupling port 206.

Conversely, when the communication control module 222 detects that the wired connection between the body-worn device 200 and the body-worn hub 104 is terminated, the communication control module 222 may power on the short-range wireless transceiver. For example, the one or more electrical properties at the electrically conductive coupling port 206 may indicate to the communication control module 222 that the wired connection is severed. The powering on of the short-range wireless transceiver may enable the body-worn device 200 to reestablish a short-range wireless communication link with the body-worn hub 104.

In some embodiments, the body-worn device 200 may be configured by default to communicatively link with the body-worn hub 104 because they are both assigned to the law enforcement officer 102. However, when the communication control module 222 is unable to establish communication with the body-worn hub 104, the module is configured to attempt to establish short-range wireless communication with an alternative hub. The alternative hub may be a vehicle hub that is assigned to the law enforcement officer 102, a body-worn hub of another law enforcement officer (e.g., the body-worn hub 128), a vehicle hub of another law enforcement officer (e.g., the vehicle hub 132), etc. As a last resort and if the body-worn device 200 is capable, the communication control module 222 may be configured to attempt to directly establish communication with a server 114 of the NOC 112 via a long-range wireless communication link. When there are multiple alternative hubs within short-range wireless communication range, the communication control module 222 may be configured to wirelessly link with an alternative hub that is presenting a strongest wireless communication signal strength to the body-worn device 200. The communication control module 222 may use the authentication module 218 to perform authentication with the alternative hub in order to form the wireless communication connection.

The clock synchronization module 224 may receive requests for current dates and times that are tracked by the RTC circuit of the body-worn device 200 from various hubs and the server 114. The date and time tracked by the RTC circuit may be used by the event data module 216 to timestamp the event data. In response to the requests, the clock synchronization module 224 may provide the current date and time to the various hubs and the server 114. The clock synchronization module 224 may further receive clock correction commands from the various hubs and the server 114. The clock correction commands may contain update values for the data and time information maintained by the RTC circuit. In turn, the clock synchronization module 224 may apply the update values to the date and time information maintained by the RTC circuit.

The data backup module 226 may be configured to send event data captured by a body-worn device 200 to a hub, as well as store the event data in the data store 228. The hub may be any hub that the body-worn device 200 is communicatively connected to, such as a body-worn hub or a vehicle hub. The event data may be sent by the data backup module 226 on a continuous basis or in discrete blocks that correspond to multiple time periods, such as every 5 minutes, every 10 minutes, every 20 minutes, etc. In turn, the data backup module 226 may receive commands to delete event data for a predetermined period of time as stored in the data store 228 and delete the corresponding event data.

Example Hub Components

Figure 3:
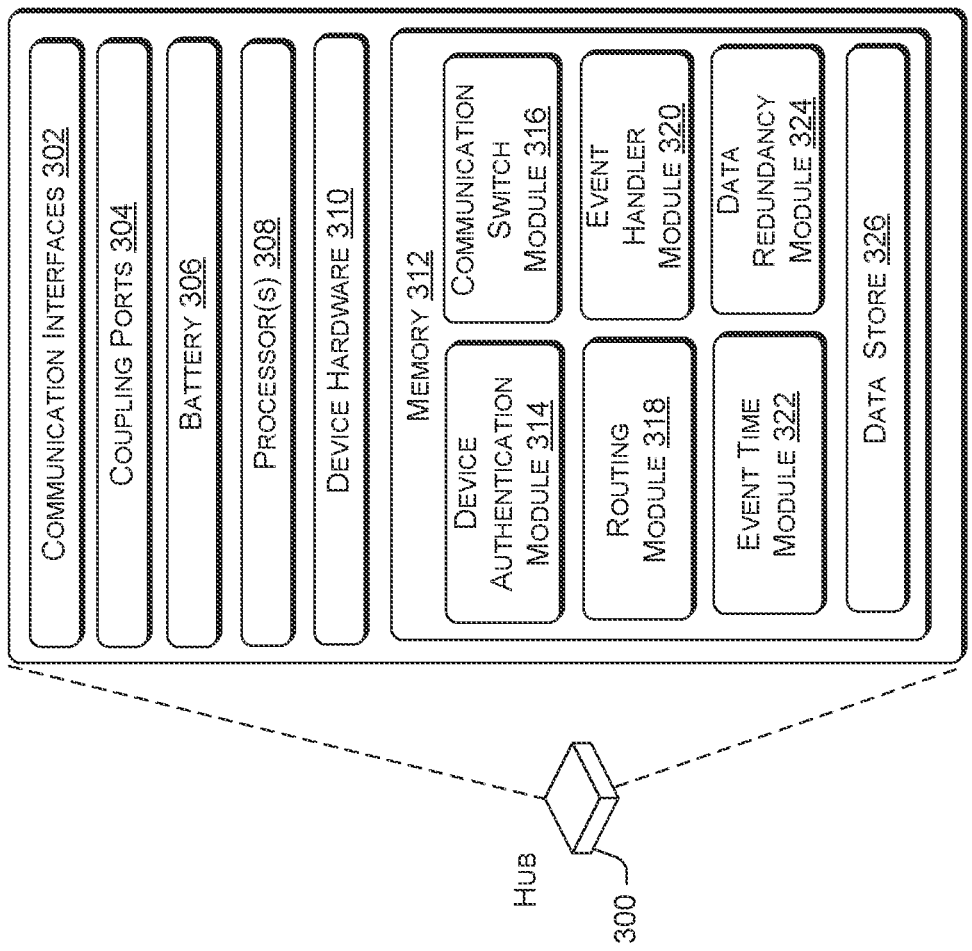
FIG. 3 is a block diagram showing various components of a hub that participates in clock synchronization and data redundancy when integrated into a mesh network of user devices.

FIG. 3 is a block diagram showing various components of a hub that participates in clock synchronization and data redundancy when integrated into a mesh network of user devices. In various embodiments, the hub 300 may be a body-worn hub or a vehicle hub. The hub 300 may be equipped with communication interfaces 302, a set of electrically conductive coupling ports 304, a battery 306, one or more processors 308, device hardware 310, and/or memory 312. The communication interfaces 302 may include one or more short-range wireless communication transceivers (e.g., Bluetooth, UWB, Wi-Fi transceivers, and/or so forth), and/or one or more long-range wireless communication transceivers (e.g., cellular, satellite, and/or so forth). Each of the electrically conductive coupling ports 304 may be configured to accept an electrically conductive wired connector. The wired connector may be used by the hub 300 to receive power input from an external source, output power to an external load, as well as for performing wired communications. Generally speaking, the battery 306 of the hub 300 is configured to have a larger battery capacity than the batteries of the body-worn device.

The device hardware 310 may include signal converters, antennas, modems, hardware decoders and encoders, digital signal processors, an RTC circuit, and/or so forth that enable the hub 300 to execute applications and exchange data with other devices, such as the body-worn devices 106(1)-106(N), via wired or wireless communication.

The memory 312 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 308 and the memory 312 of the hub 300 may implement a device authentication module 314, a communication switch module 316, a routing module 318, an event handler module 320, an event time module 322, and a data redundancy module 324. These modules may include routines, program instructions, objects, and/or data structures that perform particular tasks or implement particular abstract data types. The memory 312 may further store software (e.g., drivers, applications, firmware, etc.) that support various functionalities of the hub 300, such as software that are executed by the processors 308 to support the establishment of wired and wireless communication links. The memory 312 may also provide a data store 326. The data store 326 may store the event data collected by the body-worn devices 106(1)-106(N). In some embodiments, an operating system may also be implemented via the one or more processors 308 and the memory 312 to perform various functions, as well as provide an execution environment that supports the executions of applications and modules.

The device authentication module 314 may authenticate various body-worn devices so that the hub may exchange wireless communication with the various body-worn devices. During a device authentication process, the device authentication module 314 may receive a device authentication credential (e.g., a device identifier, a secret code, a key, a digital certificate, and/or so forth) from a body-worn device. The device authentication module 314 may validate the device authentication credential against a list of authorized device authentication credentials stored in the memory 312 to determine if the body-worn device is authorized. Accordingly, the device authentication module 314 may determine that the device authentication credential of a body-worn device is valid when the device authentication credential matches an authorized device authentication credential stored in the data store 326. The list of device authentication credentials may be updated or modified by the server 114 of the NOC 112. Alternatively, or concurrently, the device authentication module 314 may provide a hub authentication credential to a body-worn device for the body-worn device to perform mutual authentication. In some embodiments, the authentication module 218 may also be configured to perform a secret key exchange with a hub or a server so that a corresponding secret key can be used to encrypt or decrypt the secured communication exchanged.

In instances in which the hub 300 is a body-worn hub, the communication switch module 316 may switch the body-worn hub 104 between using the short-range wireless transceiver and a corresponding electrically conductive coupling port to exchange communications with a body-worn device. In some embodiments, the communication switch module 316 may automatically terminate a short-range wireless communication link that is established with the body-worn device when a wired connection is established with the body-worn device via a particular coupling port of the set of electrically conductive coupling ports 206. For example, the communication switch module 316 may detect that the body-worn device is connected to a particular coupling port based on change in one or more electrical properties (e.g., voltage, resistance, and/or current) at the particular coupling port. As a result, the communication switch module 316 may send a termination command via the particular coupling port to command the body-worn device to power off its short-range transceiver.

In other embodiments, the communication switch module 316 may further use a wired communication protocol (e.g., Universal Serial Bus (USB) protocol, TCP/IP, or some other wired communication protocol) to establish a wired communication link with the body-worn hub 104 over the wired connection. In some instances, the communication switch module 316 may wait for the body-worn device to initiate the establishment of the wired communication link using the wired communication protocol. However, in other instances, the communication switch module 316 may initiate the establishment of the wired communication link with the body-worn device using the wired communication protocol. Once the wired communication link is established, the communication switch module 316 may send a termination command via the particular coupling port to command the body-worn device to power off its short-range transceiver. In some instances, when the communication switch module 316 has received short-range wireless communication termination confirmations from all body-worn devices connected to its coupling ports, the communication switch module 316 may power off its short-range transceiver as well to conserve battery power.

Conversely, when the communication switch module 316 detects that the wired connection between the body-worn hub 104 and at least one body-worn device is severed, the communication switch module 316 may power on the short-range wireless transceiver of the body-worn hub 104. For example, the one or more electrical properties at the electrically conductive coupling port 206 may indicate to the communication switch module 316 that the wired connection is severed. In another example, the communication switch module 316 may determine that a wired connection to a body-worn device is severed when there is a lack of a periodic keep alive or heartbeat signal received from the body-worn device via the wired connection for a predetermined period of time. The powering on of the short-range wireless transceiver may enable the body-worn hub 104 to reestablish a short-range wireless communication link with the body-worn device with the severed wired connection.

The routing module 318 may handle the routing of event data of events that are received from the body-worn devices, such as the body-worn devices 106(1)-106(N), to various recipient devices and services. In various embodiments, the routing module 318 may route event data from one or more body-worn devices to the event handler module 320, to another hub, and/or to the servers 114 of the network NOC 112. The routing module 318 may handle the routing of event data of each event based on customizable configuration settings stored in a configuration file. For example, when the hub 300 is a vehicle hub that receives event data from body-worn hubs, the configuration settings may specify that the event data is to be stored and/or processed at the hub 300 for generating commands to body-worn devices. In another example in which the hub 300 is a body-worn hub, the configuration settings may specify that the event data is to be processed at the hub 300 only when the hub 300 is unable to communicatively connect with any vehicle hub or the servers 114, in order to conserve the battery life of the hub 300. In a further example, the configuration settings may specify that the event data is to be routed to another hub for storage and/or processing. In an additional example, the configuration settings may specify that the event data is to be routed to the servers 114 of the NOC 112 for storage and/or processing. In other examples, the configuration settings for the event data may specify a combination of one or more of such routings for the event data. In some embodiments, the routing module 318 may receive updates or modifications to the configuration file from the servers 114 of the NOC 112 for storage in the data store 326.

The event handler module 320 may use an event handler to process event data received from one or more body-worn devices to generate commands for at least one specific body-worn device to perform a particular action. In various embodiments, the event data may be notifications received from body-worn devices that are directly connected to the body-worn hub 104 and/or notifications received from body-worn devices connected to other hubs. For example, the event handler module 320 may generate a command for the body camera 106(1) to start recording when event handler module 320 receives a notification that the gun 110 is unholstered. In another example, the event handler module 320 may generate a command for the body camera 106(1) to start recording when event handler module 320 receives a notification that the gun 110 is unholstered and the biometric monitor 106(2) detects that the heart rate of the law enforcement officer 102 is above a predetermined rate threshold.

In some embodiments, the event handler module 320 may generate at least one particular command in response to one or more specific events based on a customizable handler configuration file. The customizable handler configuration file may specify one or more actions to be taken and the body-worn devices that are to take the actions for different sets of one or more event data. In other embodiments, the event handler module 320 may use a machine-learning algorithm to determine one or more actions to be taken and the body-worn devices that are to take the action based on different sets of one or more event data. However, in some additional embodiments, the event handler module 320 may be configured to send event data that the hub 300 obtains from body-worn devices and/or other hubs to another specifically designated data processing hub for processing, or jointly process the event data of events as obtained by multiple source body-worn devices with the event handler module of another hub. The event handler module 320 may receive updates or modifications to the handler configuration profile from the servers 114 of the NOC 112 for storage in the data store 326.

The event time module 322 may send requests for current dates and times that are tracked by the RTC circuit of a body-worn device to the body-worn device. The event time module 322 may send a request when the body-worn device initially connects to the hub, when the body-worn device disconnects and then reconnects to the hub, or when a predetermined period of time has elapsed as determined by the RTC circuit of the hub 300. Additionally, the event time module 322 may also send a request when the body-worn device sends event data of an event to the hub. Following the receipt of the date and time information from the body-worn device, the event time module 322 may determine whether there is a discrepancy between the received date and time information and the date and time information from the RTC circuit of the hub 300. If the discrepancy exists, the event time module 322 may record the discrepancy in a clock discrepancy log that is maintained in the data store 326 for the body-worn device. Subsequently, the event time module 322 may send a clock correction command to the body-worn device.

In some instances, the RTC circuit of the hub 300 may also be synchronized to a master clock on the server 114 in a similar fashion. For example, the RTC circuit of the hub 300 may be synchronized to the master clock when the hub 300 initially connects to the server 114, when the hub 300 disconnects and then reconnects to the server 114, when a preconfigured period of time has elapsed as determined by the master clock on the server 114, or when the hub 300 sends event data of an event to the server 114.

In some embodiments, the event time module 322 may analyze the discrepancy between the date and time information of the hub 300 and a body-worn device. For example, the hub 300 may receive event data from a gun sensor indicating that an officer fired a gun at 11:35:15 a.m. However, the event time module 322 may receive date and time information from the gun sensor following the event data indicating that the internal clock of the gun sensor is 10 seconds slower than the internal clock of the hub 300. Accordingly, the event time module 322 may tag the event data with metadata indicating that the gun was actually fired at 11:35:25 a.m.

In another example, the hub 300 may receive event data that includes a continuous body camera footage that is captured by a body camera. By analyzing when the clock of the body camera was last synchronized and the current time discrepancy over a four-hour period, the event time module 322 may determine that the body camera has a time drift of one second per hour. Such time drift information may be used by the event time module 322 or an application on the server 114 to calculate the actual time that an earlier event captured on the same body camera footage occurred. Accordingly, the event data corresponding to the event may be further tagged with the metadata that contains the actual time. In alternative embodiments, such time discrepancy analysis may be performed by an analysis application on the server 114 of the NOC 112.

In additional embodiments, the hub 300 may be configured to process event data that are received from an additional hub. For example, the additional hub may be a body-worn hub or a vehicle hub that is configured to send event data as captured by body-worn devices to the hub 300 for processing rather than perform any event data processing itself. Alternatively, the hub 300 and the additional hub may be configured to jointly process event data of events as obtained by multiple body-worn devices. In such embodiments, the event time module 322 may send a request for date and time information when the additional hub sends event data of an event to the hub 300. Following the receipt of the date and time information from the additional hub, the event time module 322 may determine whether there is a discrepancy between the received date and time information and the date and time information from the RTC circuit of the hub 300. If the discrepancy exists, the event time module 322 may record the discrepancy in a clock discrepancy log that is maintained in the data store 326 for the additional hub. Subsequently, the event time module 322 may send a clock correction command to the additional hub. Thus, in some instances, the event time module 322 may be further configured to reply to requests for date and time information from a designated data processing hub that is processing event data on the behalf of the hub 300, as well as implement clock correction commands from such a designated data processing hub.

The data redundancy module 324 may receive event data that is captured by a communicatively connected body-worn device of a mesh network. The data redundancy module 324 may be configured to automatically transfer the event data to a data store of the NOC as well as back up the data. The data store may be provided by memory in the server 114 of the NOC 112. The data redundancy module 324 may perform these functions concurrently with the event handler module 320 or as an alternative to the event handler module 320. For example, the event handler module 320 may perform its functions when the data redundancy module 324 is unable to reach the server 114 of the NOC. The event data may include discrete data for discrete events and/or continuous data streams for continuous events. In turn, the data redundancy module 324 may store the event data in the data store 326 of the hub 300. Further, the data redundancy module 324 may backup the event data to a memory of an additional hub, such as another body-worn hub or a vehicle hub. Subsequently, the data redundancy module 324 may transfer a copy of the event data for a predetermined period of time to a data store of the NOC 112. The event data for the predetermined period of time may be a portion or an entirety of the event data that the hub received from a body-worn device up to that point in time. The data store may be a secure file storage that is maintained by the NOC 112. Following receiving a confirmation from the server 114 indicating that the event data for a predetermined period of time is successfully stored in the data store of the NOC 112, the data redundancy module 324 may send a command to the additional hub to delete a backup of the event data for the predetermined period of time from the memory of the additional hub. Alternatively, or concurrently, the data redundancy module 324 may send a command to the body-worn device to delete the event data for the predetermined period of time from a memory of the body-worn device.

Example Processes

FIGS. 4-9 present illustrative processes 400-900 for implementing clock synchronization and data redundancy in a mesh network of user devices. Each of the processes 400-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-900 are described with reference to the environment 100 of FIG. 1.

Figure 4:
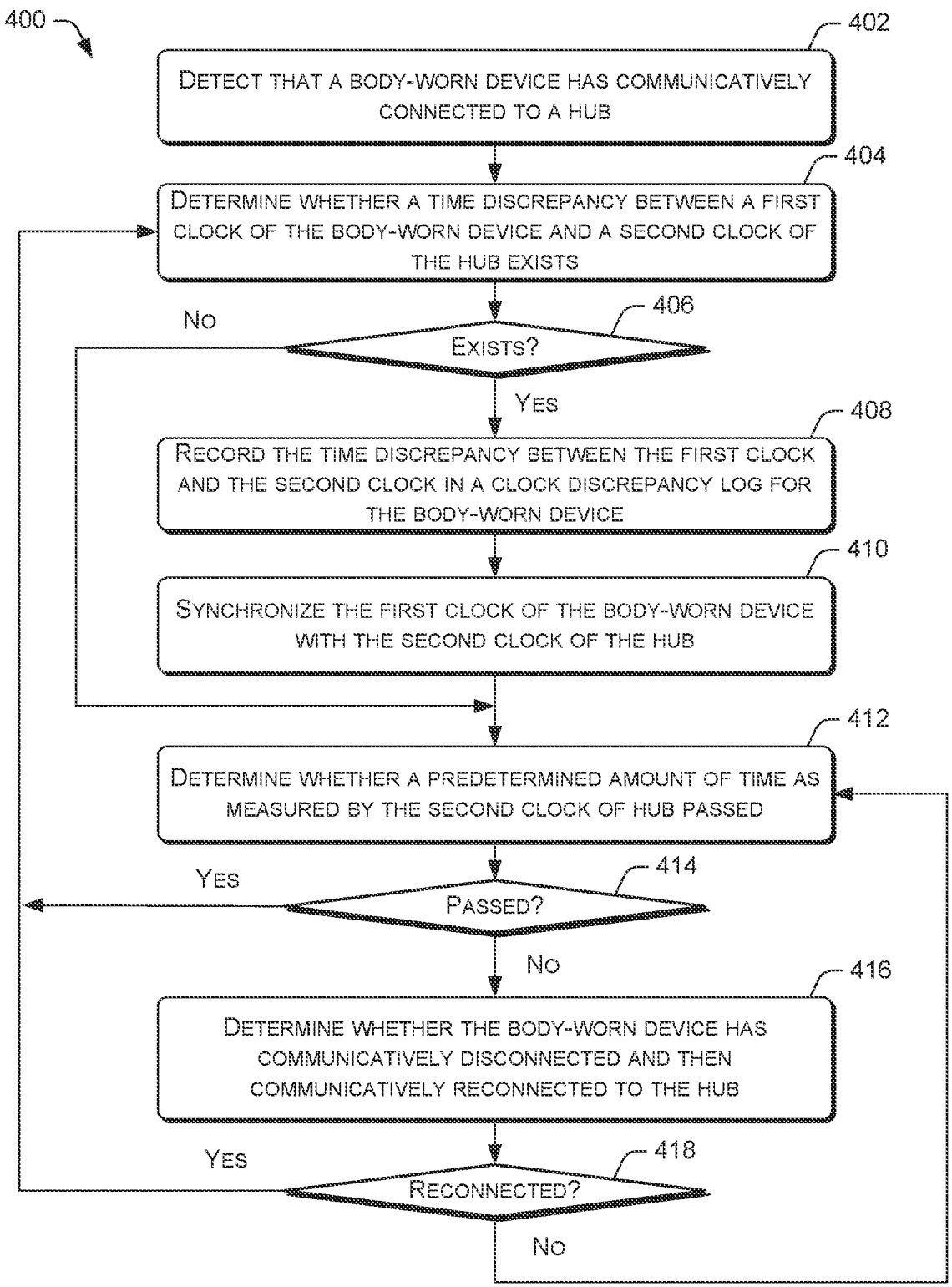
FIG. 4 is a flow diagram of an example process for clock synchronization between a body-worn device and a hub that is connected to the body-worn device.

FIG. 4 is a flow diagram of an example process 400 for clock synchronization between a body-worn device and a hub that is connected to the body-worn device. At block 402, a hub may detect that a body-worn device has communicatively connected to the hub. In various embodiments, the hub may be a body-worn hub or a vehicle hub. The hub may be a hub that is assigned to the same person (e.g., a law enforcement officer) as the body-worn device or assigned to a different person as the body-worn device. The connection may be a wireless connection or a wired connection. At block 404, the hub may determine whether a time discrepancy between a first clock of the body-worn device and a second clock of the hub exists. At decision block 406, if the hub determines that the time discrepancy exists ("yes" at decision block 406), the process 400 may proceed to block 408. At block 408, the hub may record the time discrepancy between the first clock and the second clock in a clock discrepancy log for the body-worn device. The clock discrepancy log may be maintained in a memory of the hub or at a data store of the NOC.

At block 410, the hub may synchronize the first clock of the body-worn device with the second clock of the hub. In various embodiments, the hub may send a synchronization command to the body-worn device for the body-worn device to synchronize the first clock with the second clock. At block 412, the hub may determine whether a predetermined amount of time as measured by the second clock of the hub passed. For example, the predetermined amount of time may be 30 minutes, one hour, two hours, etc. At decision block 414, if the predetermined amount of time has not passed ("no" at decision block 414), the process 400 may proceed to block 416. At block 416, the hub may determine whether the body-worn device has communicatively disconnected and then communicatively reconnected to the hub. In various embodiments, the disconnect and reconnect may involve any combination of wireless and wired communication connections. At decision block 418, if the body-worn device has not disconnected and then reconnected ("no" at decision block 418), the process may loop back to block 412. However, if the body-worn device has disconnected and then reconnected ("yes" at decision block 418), the process 400 may loop back to block 404.

Returning to decision block 406, if the hub determines that no time discrepancy exists ("no" at decision block 406), the process 400 may proceed directly to block 412. Returning to decision block 414, if the predetermined amount of time has passed ("yes" at decision block 414), the process 400 may loop back to block 404.

Figure 5:
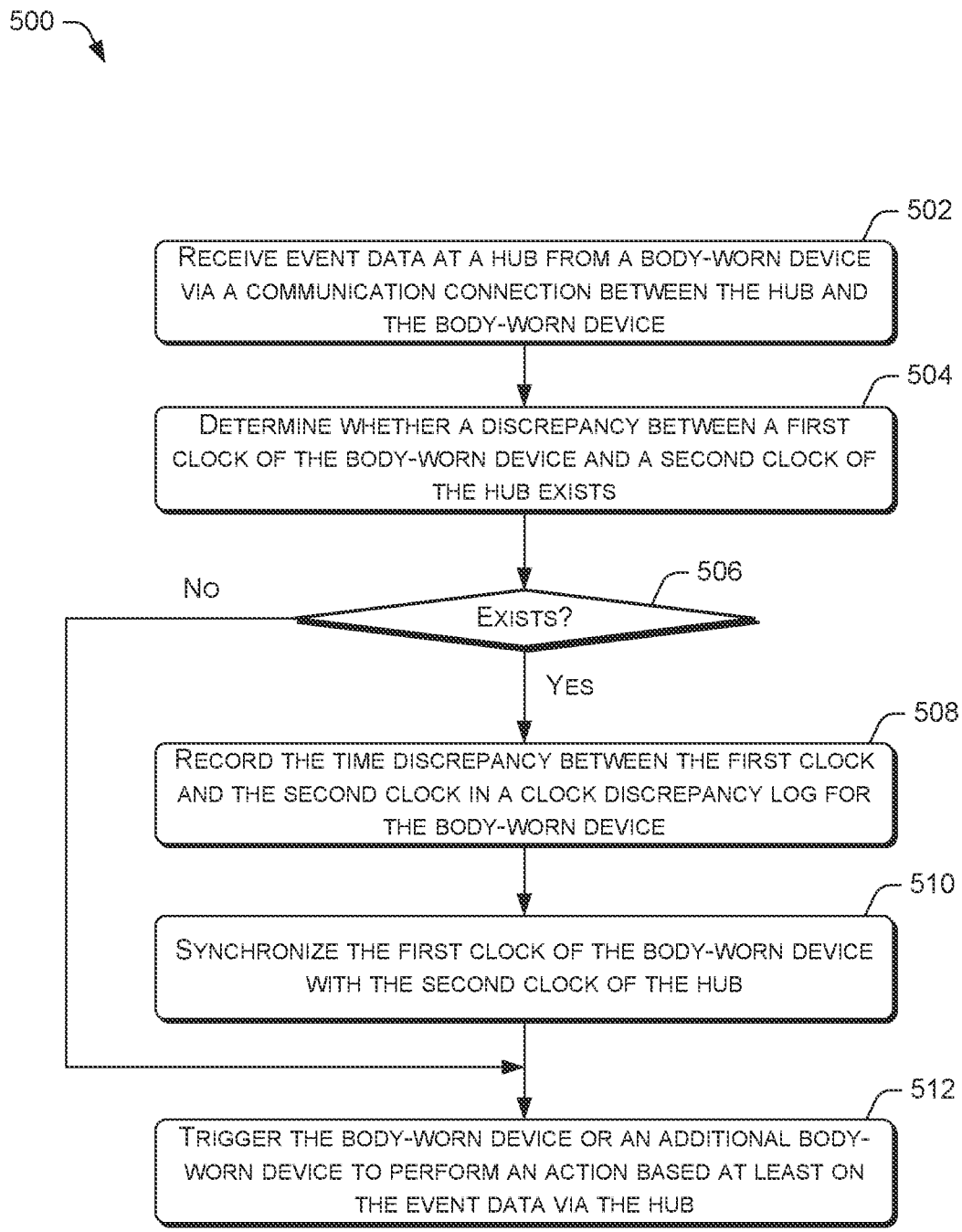
FIG. 5 is a flow diagram of an example process for clock synchronization between a body-worn device and a hub following the body-worn device sending event data to the hub.

FIG. 5 is a flow diagram of an example process 500 for clock synchronization between a body-worn device and a hub following the body-worn device sending event data to the hub. At block 502, a hub may receive event data from a body-worn device via a communication connection between the hub and the body-worn device via a communication connection between the hub and the body-worn device. In various embodiments, the hub may be a body-worn hub or a vehicle hub. The hub may be a hub that is assigned to the same person (e.g., a law enforcement officer) as the body-worn device or assigned to a different person as the body-worn device. The connection may be a wireless connection or a wired connection. At block 504, the hub may determine whether a discrepancy between a first clock of the body-worn device and a second clock of the hub exists. At decision block 506, if the discrepancy between a first clock of the body-worn device and a second clock of the hub exists ("yes" at decision block 506), the process 500 may proceed to block 508.

At block 508, the hub may record the time discrepancy between the first clock and the second clock in a clock discrepancy log for the body-worn device. The clock discrepancy log may be maintained in a memory of the hub or at a data store of the NOC. At block 510, the hub may synchronize the first clock of the body-worn device with the second clock of the hub. In various embodiments, the hub may send a synchronization command to the body-worn device for the body-worn device to synchronize the first clock with the second clock.

At block 512, the hub may trigger the body-worn device or an additional body-worn device to perform an action based at least on the event data. For example, such actions may include activating or deactivating one or more specific sensors, built-in functions, software applications, hardware components, and/or so forth of a body-worn device. While the process 500 is described in the context of a body-worn device and a hub, a similar clock synchronization may also be implemented between a first hub and a second hub following the first hub sending event data to the second hub.

Figure 6:
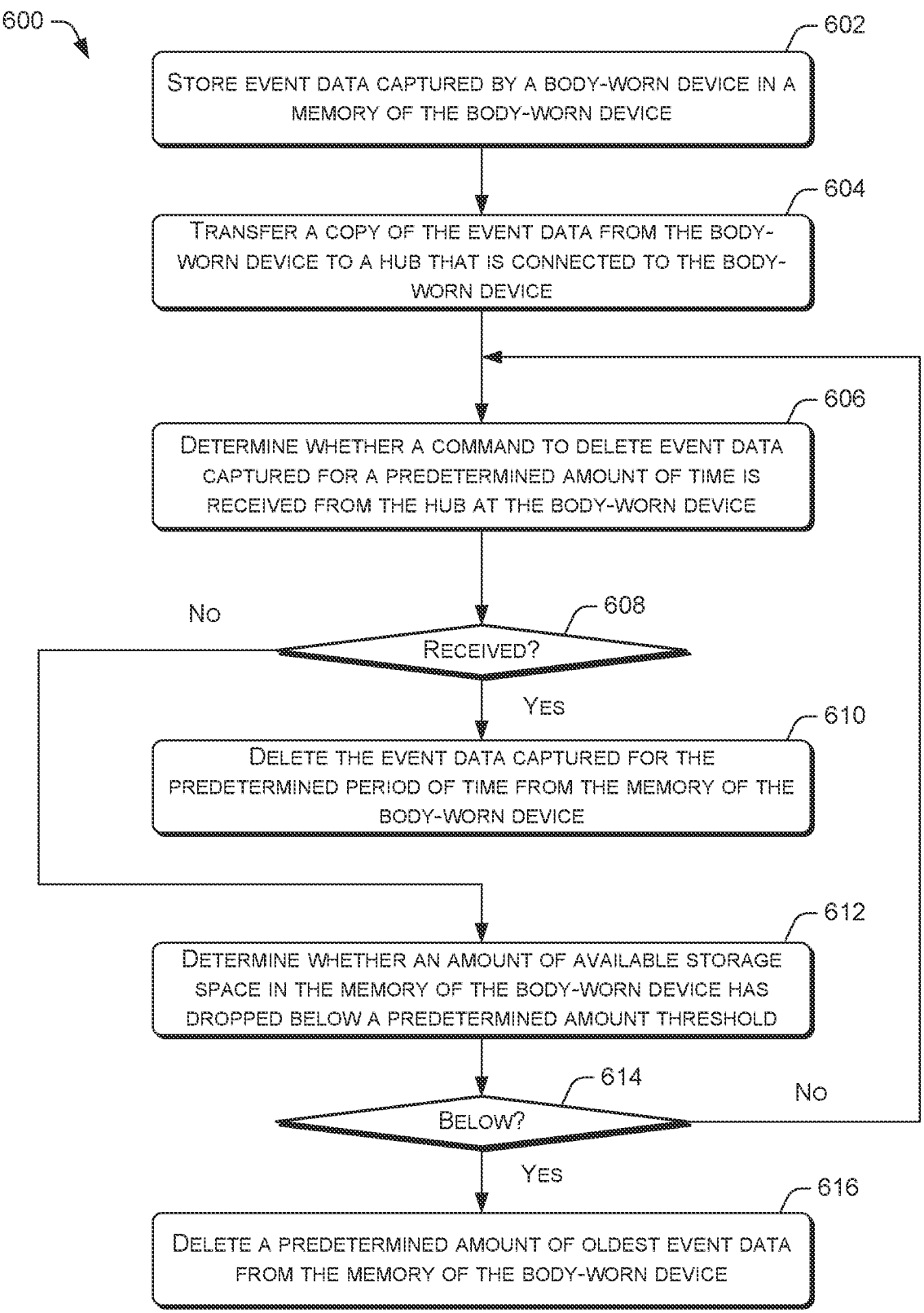
FIG. 6 is a flow diagram of an example process for backing up event data captured by a body-worn device to a body-worn hub.

FIG. 6 is a flow diagram of an example process 600 for backing up event data captured by a body-worn device to a body-worn hub. At block 602, a body-worn device may store event data captured by the body-worn device in a memory of the body-worn device. At block 604, the body-worn device may transfer a copy of the event data from the body-worn device to a hub that is connected to the body-worn device. In various embodiments, the hub may be a body-worn hub or a vehicle hub. The hub may be a hub that is assigned to the same person (e.g., a law enforcement officer) as the body-worn device or assigned to a different person as the body-worn device. The hub may be connected to the body-worn device via a wireless connection or a wired connection.

At block 606, the body-worn device may determine whether a command to delete event data captured for a predetermined amount of time is received from the hub at the body-worn device. At decision block 608, if the body-worn device determines that the command is received ("yes" at decision block 608), the process 600 may proceed to block 610. At block 610, the body-worn device may delete the event data captured for the predetermined period of time from the memory of the body-worn device. Such a deletion may free up the memory of the body-worn device for the storage of new event data. However, if the body-worn device determines that the command is not received ("not" at decision block 608), the process 600 may proceed to block 612. At block 612, the body-worn device may determine whether an amount of available storage space in the memory of the body-worn device has dropped below a predetermined amount threshold.

At decision block 614, if the amount of available storage space in the memory of the body-worn device has dropped below a predetermined amount threshold ("yes" at decision block 614), the process 600 may proceed to block 616. At block 616, the body-worn device may delete a predetermined amount of the oldest event data from the memory of the body-worn device. However, if the amount of available storage space in the memory of the body-worn device has not dropped below a predetermined amount threshold ("not" at decision block 614), the process 600 may loop back to block 606.

Figure 7:
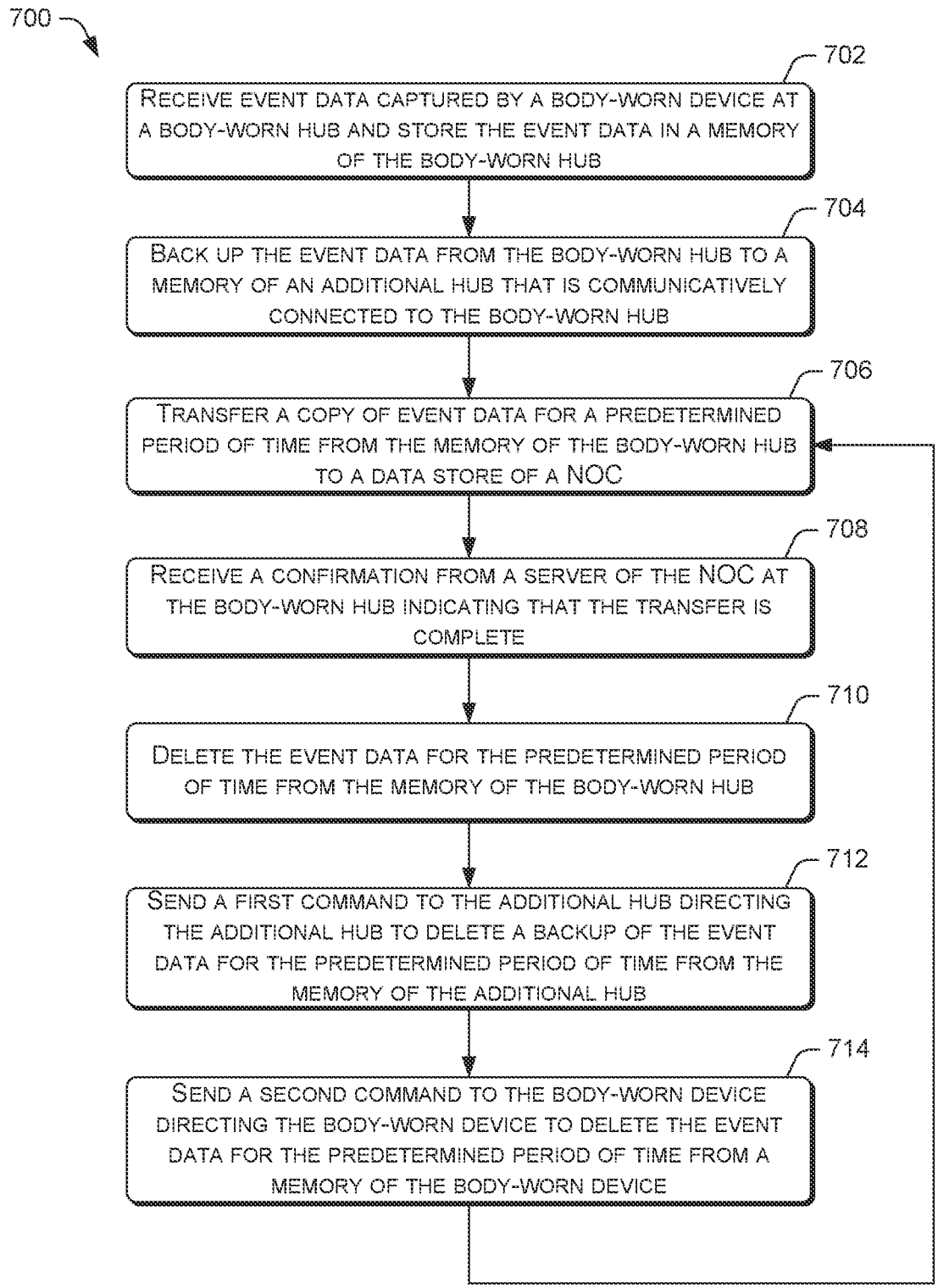
FIG. 7 is a flow diagram of an example process for backing up event data captured by a body-worn device from a body-worn hub to a vehicle hub.

FIG. 7 is a flow diagram of an example process 700 for backing up event data captured by a body-worn device from a body-worn hub to a vehicle hub. At block 702, a body-worn hub may receive event data captured by a body-worn device and store the event data in a memory of the body-worn hub. At block 704, the body-worn hub may back up the event data to a memory of an additional hub that is communicatively connected to the body-worn hub. In various embodiments, the additional hub may be a body-worn hub or a vehicle hub. The additional hub may be a hub that is assigned to the same person (e.g., a law enforcement officer) as the body-worn hub or assigned to a different person as the body-worn hub. The connection between the body-worn hub and the additional hub may be a wireless connection or a wired connection.

At block 706, the body-worn hub may transfer a copy of event data for a predetermined period of time from the memory of the body-worn hub to a data store of the NOC. The event data for the predetermined period of time may include a portion of the event data or an entirety of the event data stored in the memory of the additional hub. At block 708, the body-worn hub may receive a confirmation from a server of the NOC indicating that the transfer is complete. At block 710, the body-worn hub may delete the event data for the predetermined period of time from the memory of the body-worn hub. This may free up the memory of the body-worn hub to store additional event data from the body-worn device. At block 712, the body-worn hub may send a first command to the additional hub to direct the additional hub to delete a backup of the event data for the predetermined period time from the memory of the additional hub.

At block 714, the body-worn hub may send a second command to the body-worn device directing the body-worn device to delete the event data for the predetermined period of time from a memory of the body-worn device. This may free up the memory of the body-worn device to store additional event data captured by the body-worn device. In some instances, the process 700 may loop back to block 706 so that the body-worn hub may transfer another copy of event data for an additional predetermined period of time to the data store of the NOC. In one instance, each of the predetermined period of time and the additional predetermined period of time may be sequential periods of time (e.g., sequential minutes, hours, days, etc.)

Figure 8:
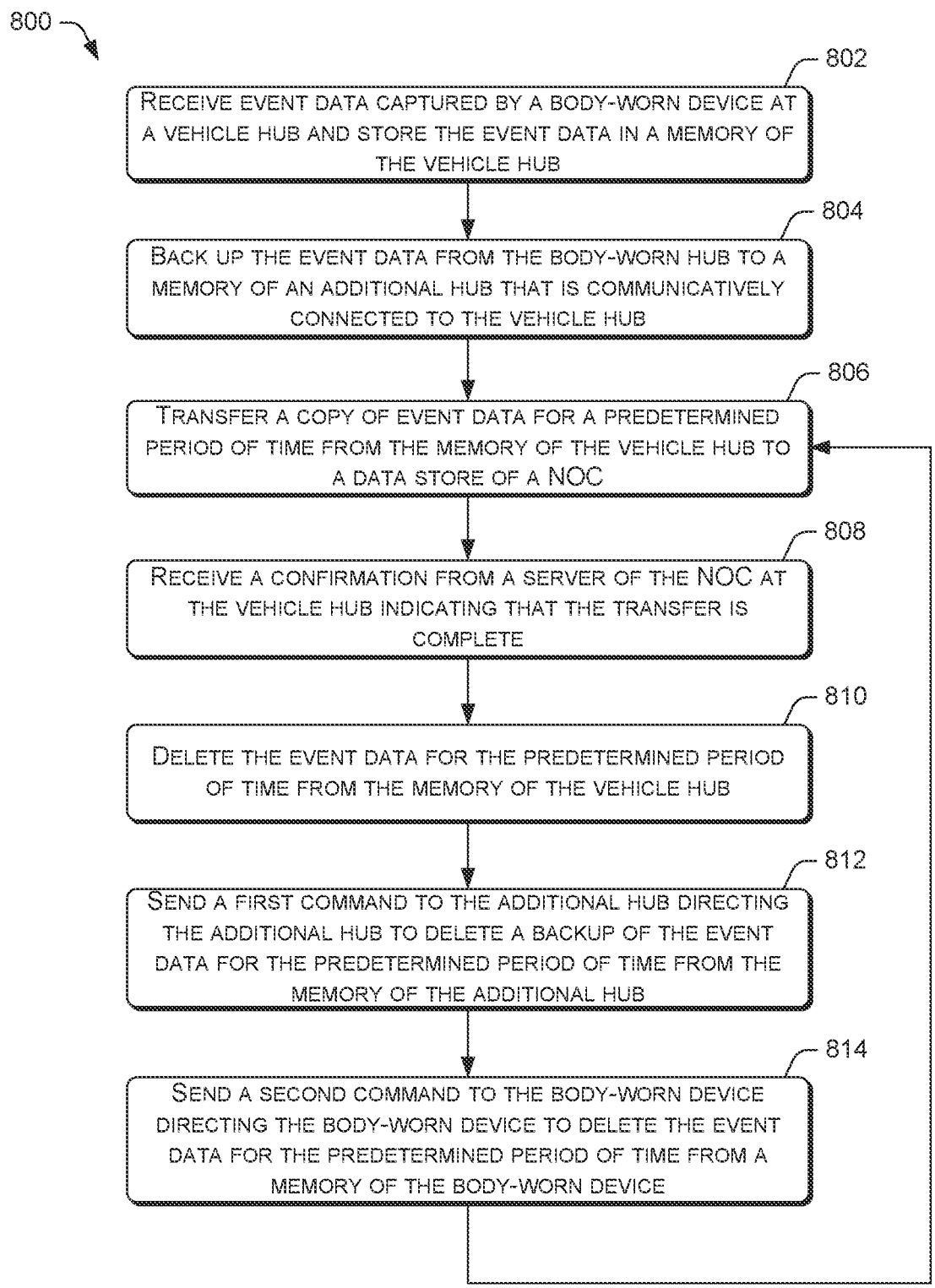
FIG. 8 is a flow diagram of an example process for backing up event data captured by a body-worn device from a vehicle hub to an additional hub.

FIG. 8 is a flow diagram of an example process 800 for backing up event data captured by a body-worn device from a vehicle hub to an additional hub. At block 802, a vehicle hub may receive event data captured by a body-worn device and store the event data in a memory of the vehicle hub. At block 804, the vehicle hub may back up the event data from the vehicle hub to a memory of an additional hub that is communicatively connected to the vehicle hub. In various embodiments, the additional hub may be a body-worn hub or a vehicle hub. The additional hub may be a hub that is assigned to the same person (e.g., a law enforcement officer) as the vehicle hub or assigned to a different person as the vehicle hub. The connection between the vehicle hub and the additional hub may be a wireless connection or a wired connection.

At block 806, the vehicle hub may transfer a copy of event data for a predetermined period of time from the memory of the vehicle hub to a data store of a NOC. The event data for the predetermined period of time may include a portion of the event data or an entirety of the event data stored in the memory of the additional hub. At block 808, the vehicle hub may receive a confirmation from a server of the NOC indicating that the transfer is complete. At block 810, the vehicle hub may delete the event data for the predetermined period of time from the memory of the vehicle hub. This may free up the memory of the vehicle hub to store additional event data from the body-worn device. At block 812, the vehicle hub may send a first command to the additional hub directing the additional hub to delete a backup of the event data for the predetermined period of time from the memory of the additional hub.

At block 814, the vehicle hub may send a second command to the body-worn device directing the body-worn device to delete the event data for the predetermined period of time from a memory of the body-worn device. This may free up the memory of the body-worn device to store additional event data captured by the body-worn device. In some instances, the process 800 may loop back to block 806 so that the vehicle hub may transfer another copy of event data for an additional predetermined period of time to the data store of the NOC. In one instance, each of the predetermined period of time and the additional predetermined period of time may be sequential periods of time (e.g., sequential minutes, hours, days, etc.)

Figure 9:
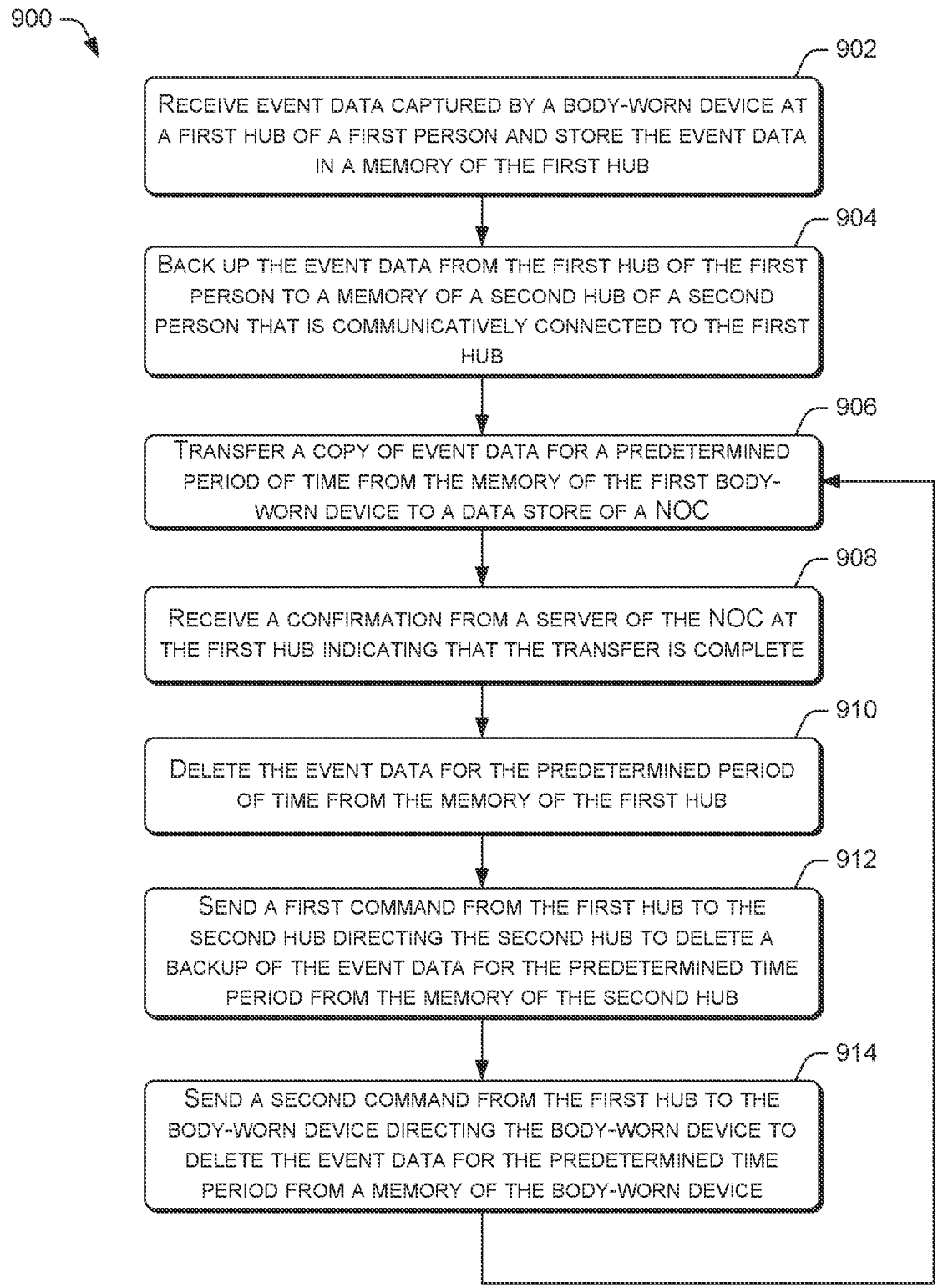
FIG. 9 is a flow diagram of an example process for backing up event data captured by a body-worn device from a first hub assigned to the first person to a second hub assigned to the second person.

FIG. 9 is a flow diagram of an example process 900 for backing up event data captured by a body-worn device from a first hub assigned to the first person to a second hub assigned to the second person. At block 902, a first hub assigned to the first person may receive event data captured by a body-worn device and store the event data in a memory of the first hub. In various embodiments, each of the first hub or the second hub may be a body-worn hub or a vehicle hub.

At block 904, the first hub may back up the event data from the first hub of the first person to a memory of a second hub assigned to the second person that is communicatively connected to the first hub. At block 906, the first hub may transfer a copy of event data for a predetermined period of time from the memory of the first hub to a data store of a NOC. At block 908, the first hub may receive a confirmation from a server of the NOC indicating that the transfer is complete. At block 910, the first hub may delete the event data for the predetermined period of time from the memory of the first hub. This may free up the memory of the first hub to store additional event data from the body-worn device. At block 912, the first hub may send a first command to the second hub directing the second hub to delete a backup of the event data for the predetermined period of time from the memory of the second hub.

At block 914, the first hub may send a second command to the body-worn device directing the body-worn device to delete the event data for the predetermined period of time from a memory of the body-worn device. This may free up the memory of the body-worn device to store additional event data captured by the body-worn device. In some instances, the process 900 may loop back to block 806 so that the first hub may transfer another copy of event data for an additional predetermined period of time to the data store of the NOC. In one instance, each of the predetermined period of time and the additional predetermined period of time may be sequential periods of time (e.g., sequential minutes, hours, days, etc.)

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a hub storing computer-executable instructions that upon execution cause one or more processors to perform acts comprising:
    determining whether a time discrepancy exists between a first clock of a user device and a second clock of a hub when the user device is communicatively connected to the hub, the determining includes the hub sending a request for a current date and time tracked by the first clock of the user device to the user device and comparing the current date and time received from the user device to an additional date and time tracked by the second clock of the hub to determine the time discrepancy;
    in response to determining that the time discrepancy exists, recording the time discrepancy between the first clock and the second clock in a clock discrepancy log maintained for the user device and then synchronizing the first clock of the user device with the second clock of the hub; and
    in response to determining that the time discrepancy does not exist, making a further determination as to whether the time discrepancy exists when a predetermined amount of time as measured by the second clock of the hub has passed or when the user device has communicatively disconnected or reconnected to the hub.

2. The one or more non-transitory computer-readable media of claim 1, wherein the acts further comprise determining whether the time discrepancy exists between the first clock of the user device and the second clock of the hub when the hub receives event data from the user device via a communication connection between the hub and the user device.

3. The one or more non-transitory computer-readable media of claim 2, wherein the acts further comprise triggering the user device or an additional user device to perform an action based at least one on the event data.

4. The one or more non-transitory computer-readable media of claim 2, wherein the acts further comprise extrapolating an actual event occurrence time of an event related to the event data based on the time discrepancy recorded in the clock discrepancy log.

5. The one or more non-transitory computer-readable media of claim 1, where the user device is a body-worn device and the hub is a body-worn hub that are carried by a law enforcement officer.

6. The one or more non-transitory computer-readable media of claim 5, wherein the body-worn hub is integrated into a ballistic vest worn by the law enforcement officer.

7. The one or more non-transitory computer-readable media of claim 1, wherein the user device is a gun sensor, a biometric monitor, a smartphone, a radio, or a body camera.

8. The one or more non-transitory computer-readable media of claim 1, wherein the user device is communicatively connected to the hub via a wireless communication connection or a wired communication connection.

9. A body-worn device, comprising:
    one or more processors; and
    memory including a plurality of computer-executable components that are executable by the one or more processors to perform a plurality of actions, the plurality of actions comprising:
        storing event data captured by the body-worn device in a memory of the body-worn device, the body-worn device being communicatively connected to a hub;
        transferring a copy of the event data from the body-worn device to the hub that is communicatively connected to the body-worn device; and
        deleting event data captured for a predetermined period of time in response to a command to delete event data captured for the predetermined period of time from the hub.

10. The body-worn device of claim 9, wherein the actions further comprise deleting a predetermined amount of oldest event data from the memory of the body-worn device when an amount of available storage in the memory of the body-worn device has dropped below a predetermined amount threshold.

11. The body-worn device of claim 9, wherein the hub is a body-worn hub carried by a person or a vehicle hub in a vehicle.

12. The body-worn device of claim 11, wherein the body-worn device and the body-worn hub are carried by a law enforcement officer.

13. The body-worn device of claim 12, wherein the body-worn hub is integrated into a ballistic vest worn by the law enforcement officer.

14. The body-worn device of claim 9, wherein the body-worn device is a gun sensor, a biometric monitor, a smartphone, a radio, or a body camera.

15. The body-worn device of claim 9, wherein the body-worn device is communicatively connected to the hub via a wireless communication connection or a wired communication connection.

16. A computer-implemented method, comprising:
receiving event data captured by a body-worn device at a hub and storing the event data in a first memory of the hub, the hub being communicatively connected to the body-worn device via a first wireless communication link or a wired communication link and further communicatively connected to a server via a second wireless communication link;
backing up the event data from the hub to a second memory of an additional hub that is communicatively connected to the hub;
transferring a copy of event data for a predetermined period of time as included in the event data from the first memory of the hub to a data store of the server; and
in response to receiving a confirmation from the server indicating that the transfer of the event data from the first memory of the hub to the data store of the server is complete, performing at least one of:
deleting the event data for the predetermined period of time from the first memory of the hub that is communicatively connected to the body-worn device and the server;
sending a first command to the additional hub that is communicatively connected to the hub directing the additional hub to delete a backup of the event data for the predetermined period of time from the second memory of the additional hub; or
sending a second command to the body-worn device directing the body-worn device to delete the event data for the predetermined period of time from a third memory of the body-worn device.

17. The computer-implemented method of claim 16, wherein each of the hub or the additional hub is a body-worn hub or a vehicle hub in a vehicle.

18. The computer-implemented method of claim 16, wherein the hub is assigned to a first person and the additional hub is assigned to a second person.

19. The computer-implemented method of claim 18, wherein each of the first person and the second person is a law enforcement officer.

20. The computer-implemented method of claim 16, wherein the hub is connected to the additional hub via a wireless communication connection.

* * * * *